(12) United States Patent
Bacallao et al.

(10) Patent No.: US 10,259,480 B2
(45) Date of Patent: *Apr. 16, 2019

(54) SHOPPING CART BAGGING STATION AND METHOD OF FORMING THE SAME

(71) Applicant: Walmart Apollo, LLC, Bentonville, AR (US)

(72) Inventors: Yurgis Mauro Bacallao, Centerton, AR (US); Stephen Tyler Caution, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/383,151

(22) Filed: Dec. 19, 2016

(65) Prior Publication Data

US 2017/0174243 A1    Jun. 22, 2017

Related U.S. Application Data

(60) Provisional application No. 62/402,475, filed on Sep. 30, 2016, provisional application No. 62/377,135, (Continued)

(51) Int. Cl.
*B62B 3/10* (2006.01)
*A47F 9/04* (2006.01)
(Continued)

(52) U.S. Cl.
CPC .............. *B62B 3/106* (2013.01); *A47F 9/042* (2013.01); *B62B 3/1464* (2013.01); *B65B 67/1227* (2013.01); *B65B 67/1266* (2013.01)

(58) Field of Classification Search
CPC . B65B 67/1227; B65B 67/1266; B62B 3/106; B62B 3/1464; A47F 9/042
See application file for complete search history.

(56) References Cited

U.S. PATENT DOCUMENTS 259,932 A    6/1882  Sims
370,563 A    9/1887  Simmons
(Continued)

FOREIGN PATENT DOCUMENTS

AU    1142402 A1    4/2002
AU    2002364902 A1    5/2004
(Continued)

OTHER PUBLICATIONS

Search Report in GB Patent Application No. GB1713267.1, dated Dec. 22, 2017; 5 pages.
(Continued)

*Primary Examiner* — Derek J Battisti
(74) *Attorney, Agent, or Firm* — Schmeiser, Olsen & Watts LLP

(57) ABSTRACT

A shopping cart bagging station that can be made from recyclable materials and is lightweight and portable is described. The shopping cart bagging station can be molded or otherwise formed of a single unitary piece of material. The shopping cart bagging station can be mounted in various locations on a shopping cart, making it easy and convenient for a customer to carry and load a plurality of shopping bags as they shop. The shopping cart bagging station includes a support bar with a bag holder hook and pair of shopping bag handle arms. The shopping cart bagging station also includes a first and a second mounting structure. The first and the second mounting structure are configured to couple the shopping cart bagging station to a shopping cart.

5 Claims, 6 Drawing Sheets

Related U.S. Application Data filed on Aug. 19, 2016, provisional application No. 62/377,143, filed on Aug. 19, 2016, provisional application No. 62/298,011, filed on Feb. 22, 2016, provisional application No. 62/298,017, filed on Feb. 22, 2016, provisional application No. 62/270,813, filed on Dec. 22, 2015, provisional application No. 62/270,827, filed on Dec. 22, 2015, provisional application No. 62/270,785, filed on Dec. 22, 2015.

(51) Int. Cl.
*B62B 3/14* (2006.01)
*B65B 67/12* (2006.01)

(56) References Cited

U.S. PATENT DOCUMENTS

| | | |
|---|---|---|
| 562,229 A | 6/1896 | Lenney |
| 635,100 A | 10/1899 | Huebel |
| 765,388 A | 7/1904 | Lanpher |
| 797,871 A | 8/1905 | Smith |
| 809,568 A | 1/1906 | Hulburt |
| 873,188 A | 12/1907 | Thumann |
| 890,693 A | 6/1908 | McCoy |
| 893,930 A | 7/1908 | Lederman |
| 896,443 A | 8/1908 | Dyett |
| 936,736 A | 10/1909 | Porter et al. |
| 995,798 A | 6/1911 | McCullough |
| 1,055,745 A | 3/1913 | Harrison |
| 1,069,108 A | 8/1913 | Buhl |
| 1,252,740 A | 1/1918 | Thornblade |
| 1,284,579 A | 11/1918 | Brown |
| 1,653,393 A | 12/1927 | Cox |
| 1,662,140 A | 3/1928 | Whitesides |
| 2,240,629 A | 5/1941 | Smith |
| 2,305,863 A | 12/1942 | Ginter |
| 2,498,446 A | 2/1950 | Pawsat |
| 2,563,679 A | 8/1951 | Hardy |
| 2,603,438 A | 7/1952 | Adams |
| 2,682,956 A | 7/1954 | Pike |
| 2,797,058 A | 6/1957 | Packham |
| 3,133,660 A | 5/1964 | Roberts |
| 3,266,742 A | 8/1966 | Pena |
| 3,313,504 A | 4/1967 | Thorkild |
| 3,339,745 A | 9/1967 | Sugerman |
| D209,279 S | 11/1967 | Cohen |
| 3,438,644 A | 4/1969 | Kaplan et al. |
| 3,475,067 A | 10/1969 | Girard |
| 3,747,298 A | 7/1973 | Lieberman |
| 3,930,696 A | 1/1976 | Hight et al. |
| 3,943,859 A | 3/1976 | Boone |
| 3,995,803 A | 12/1976 | Uitz |
| 4,048,754 A | 9/1977 | Laux |
| 4,082,939 A | 4/1978 | Walters |
| 4,106,617 A | 8/1978 | Boone |
| 4,269,336 A | 5/1981 | Humlong |
| 4,305,558 A | 12/1981 | Baker |
| 4,354,643 A | 10/1982 | Kenner |
| 4,367,819 A | 1/1983 | Lewis |
| 4,376,502 A | 3/1983 | Cohen |
| 4,403,807 A | 9/1983 | Wilkinson et al. |
| 4,456,125 A | 6/1984 | Chap |
| 4,583,753 A | 4/1986 | Economy |
| 4,595,153 A | 6/1986 | Goetz |
| 4,655,409 A | 4/1987 | Zima |
| 4,682,782 A | 7/1987 | Mills |
| 4,702,402 A | 10/1987 | Ferri |
| 4,728,070 A | 3/1988 | Engelbrecht |
| 4,838,504 A | 6/1989 | Bittenbinder |
| D302,062 S | 7/1989 | Sable |
| 4,881,577 A | 11/1989 | Stroh et al. |
| 4,881,706 A | 11/1989 | Sedlik |
| 4,968,047 A | 11/1990 | Ferris |
| 4,974,799 A * | 12/1990 | Palmer .................. B62B 3/106 224/411 |
| 4,997,149 A | 3/1991 | Koch |
| 4,998,647 A | 3/1991 | Sharp |
| 4,998,694 A | 3/1991 | Barteaux |
| 5,002,215 A | 3/1991 | Gregoire |
| 5,005,791 A | 4/1991 | Lanzen |
| 5,190,253 A | 3/1993 | Sable |
| 5,362,077 A | 11/1994 | Adamson |
| 5,366,123 A | 11/1994 | Range |
| 5,385,318 A | 1/1995 | Rizzuto |
| 5,390,443 A | 2/1995 | Emalfarb et al. |
| 5,437,346 A | 8/1995 | Dumont |
| 5,439,120 A | 8/1995 | Brozak |
| 5,443,173 A | 8/1995 | Emery et al. |
| D363,208 S | 10/1995 | Seidel |
| 5,460,279 A | 10/1995 | Emery et al. |
| 5,465,846 A | 11/1995 | Blyth et al. |
| 5,513,823 A | 5/1996 | Bresnahan |
| 5,531,366 A | 7/1996 | Strom |
| 5,533,361 A | 7/1996 | Halpern |
| 5,564,566 A | 10/1996 | Lamb |
| 5,618,008 A | 4/1997 | Dearwester et al. |
| 5,636,818 A | 6/1997 | Edwards et al. |
| 5,704,497 A | 1/1998 | Wyatt |
| 5,727,721 A | 3/1998 | Guido et al. |
| D396,372 S | 7/1998 | Goodman |
| 5,836,486 A | 11/1998 | Ohsugi |
| 5,875,902 A | 3/1999 | Emery et al. |
| D412,080 S | 7/1999 | Emery et al. |
| 6,018,397 A | 1/2000 | Cloutier et al. |
| 6,041,945 A | 3/2000 | Faraj |
| 6,086,023 A | 7/2000 | Kerr et al. |
| 6,109,462 A | 8/2000 | Emalfarb et al. |
| 6,152,408 A | 11/2000 | O'Grady |
| 6,155,521 A | 12/2000 | O'hanlon |
| 6,170,679 B1 | 1/2001 | Frye |
| 6,193,265 B1 * | 2/2001 | Yemini .................. B60B 37/10 280/47.31 |
| 6,299,001 B1 | 10/2001 | Frolov et al. |
| 6,305,572 B1 | 10/2001 | Daniels et al. |
| D452,944 S | 1/2002 | Schmidt |
| 6,341,704 B1 | 1/2002 | Michel, Jr. |
| 6,364,266 B1 | 4/2002 | Garvin |
| 6,390,422 B2 | 5/2002 | Banko |
| 6,409,031 B1 | 6/2002 | Wynne |
| D459,979 S | 7/2002 | Goodman |
| 6,481,583 B1 | 11/2002 | Black et al. |
| 6,543,638 B2 | 4/2003 | Wile |
| 6,561,403 B1 | 5/2003 | Kannankeril et al. |
| 6,601,759 B2 | 8/2003 | Fife et al. |
| 6,606,411 B1 | 8/2003 | Loui et al. |
| 6,607,229 B1 * | 8/2003 | McIntosh ............... B60J 7/1621 296/100.07 |
| 6,648,265 B2 | 11/2003 | Goldberg |
| 6,655,537 B1 | 12/2003 | Lang et al. |
| 6,685,075 B1 | 2/2004 | Kannankeril |
| 6,726,145 B1 | 4/2004 | Kraus |
| 6,726,156 B1 | 4/2004 | Scola |
| D490,691 S | 6/2004 | Buss et al. |
| 6,745,186 B1 | 6/2004 | Testa et al. |
| 6,789,687 B2 | 9/2004 | Cramer |
| 6,805,271 B2 | 10/2004 | Holden |
| 6,810,149 B1 | 10/2004 | Squilla et al. |
| 6,832,739 B1 | 12/2004 | Kraus |
| 6,886,101 B2 | 4/2005 | Glazer et al. |
| 6,937,989 B2 | 8/2005 | Mcintyre et al. |
| 7,066,389 B2 | 6/2006 | Dickover et al. |
| 7,077,612 B1 | 7/2006 | Giggle, III et al. |
| 7,128,251 B1 | 10/2006 | Galle |
| 7,172,092 B2 | 2/2007 | Yang et al. |
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |

(56) References Cited

U.S. PATENT DOCUMENTS

| | | |
|---|---|---|
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,850,014 B2 | 12/2010 | Nguyen et al. |
| 7,887,068 B2 | 2/2011 | Ferguson |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| D689,282 S * | 9/2013 | Lindeman ............... D3/231 |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 * | 12/2015 | Tong ............... B62B 3/102 |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 * | 3/2003 | Werner ............... B62B 3/1472 280/33.991 |
| 2003/0052464 A1 * | 3/2003 | McGuire ............. B62B 3/1472 280/33.992 |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0075015 A1 | 4/2004 | Cain et al. |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0219219 A1 | 9/2010 | Svetina |
| 2010/0264101 A1 | 10/2010 | Ma |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 * | 12/2013 | Marsh ............... A47F 13/085 414/800 |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1 | 10/2016 | Hendrick et al. |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174243 A1 | 6/2017 | Bacallao et al. |
| 2017/0197650 A1 | 7/2017 | Whistler |
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |

(56) References Cited

FOREIGN PATENT DOCUMENTS

| WO | 2007141417 A1 | 12/2007 |
|---|---|---|
| WO | 2010083113 | 7/2010 |
| WO | 2011008625 | 1/2011 |
| WO | 2013079878 | 6/2013 |

OTHER PUBLICATIONS

Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"Simplehuman Stainless Steel Grocery Bag Holder," ContainerStore.com, accessed on Jun. 14, 2017; 2 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
Search Report in GB Patent Application No. GB1713283.8, dated Dec. 22, 2017; 4 pages.
"POS Check Out Plastic Bag Holder Dispenser FOR Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Non-Final Office Action in U.S. Appl. No. 15/383,170, dated Jul. 3, 2018; 10 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Non-Final Office Action in U.S. Appl. No. 15/433,388 dated Dec. 31, 2018; 6 pages.
Restriction Requirement in U.S. Appl. No. 15/433,365 dated Dec. 31, 2018; 5 pages.
Notice of Allowance in U.S. Appl. No. 15/383,126 dated Jan. 15, 2019; 5 pages.
Non-Final Office Action in U.S. Appl. No. 15/433,365 dated Feb. 5, 2019; 8 pages.
Timmerman, J.D. "Bag Holder," U.S. Pat. No. 477,235 issued on Jun. 21, 1892.

\* cited by examiner

SHOPPING CART BAGGING STATION AND METHOD OF FORMING THE SAME

CROSS REFERENCE TO RELATED APPLICATIONS

This invention claims priority to U.S. provisional patent application Ser. No. 62/270,785, filed Dec. 22, 2015 to Applicant Wal-Mart Stores Inc., and entitled "Shopping Cart Bagging Station and Method of Forming the Same", U.S. provisional patent application Ser. No. 62/270,813, filed Dec. 22, 2015 to Applicant Wal-Mart Stores Inc., and entitled "Shopping Cart Bagging Station and Method of Forming the Same", U.S. provisional patent application Ser. No. 62/270,827, filed Dec. 22, 2015 to Applicant Wal-Mart Stores Inc., and entitled "Shopping Cart Bagging Station and Method of Forming the Same", U.S. provisional patent application Ser. No. 62/298,011, filed Feb. 22, 2016 to Applicant Wal-Mart Stores Inc., and entitled "Shopping Cart Bagging Station and Method of Forming the Same", U.S. provisional patent application Ser. No. 62/298,017, filed Feb. 22, 2016 to Applicant Wal-Mart Stores Inc., and entitled "Shopping Cart Bagging Station and Method of Forming the Same", U.S. provisional patent application Ser. No. 62/377,135, filed Aug. 19, 2016 to Applicant Wal-Mart Stores Inc., and entitled "Shopping Cart Bagging Station and Method of Forming the Same", U.S. provisional patent application Ser. No. 62/377,143, filed Aug. 19, 2016 to Applicant Wal-Mart Stores Inc., and entitled "Shopping Cart Bagging Station and Method of Forming the Same", and U.S. provisional patent application Ser. No. 62/402,475, filed Sep. 30, 2016 to Applicant Wal-Mart Stores Inc., and entitled "Shopping Cart Bagging Station and Method of Forming the Same", which are included entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations besides checkout stations. There is a need for bagging stations in locations in retail stores besides at the checkout station.

Accordingly, what is needed is a bagging station that can be mounted in a shopping cart, so that customers can bag their purchases as they shop.

DETAILED DESCRIPTION OF EMBODIMENTS OF THE INVENTION

Figure 1:
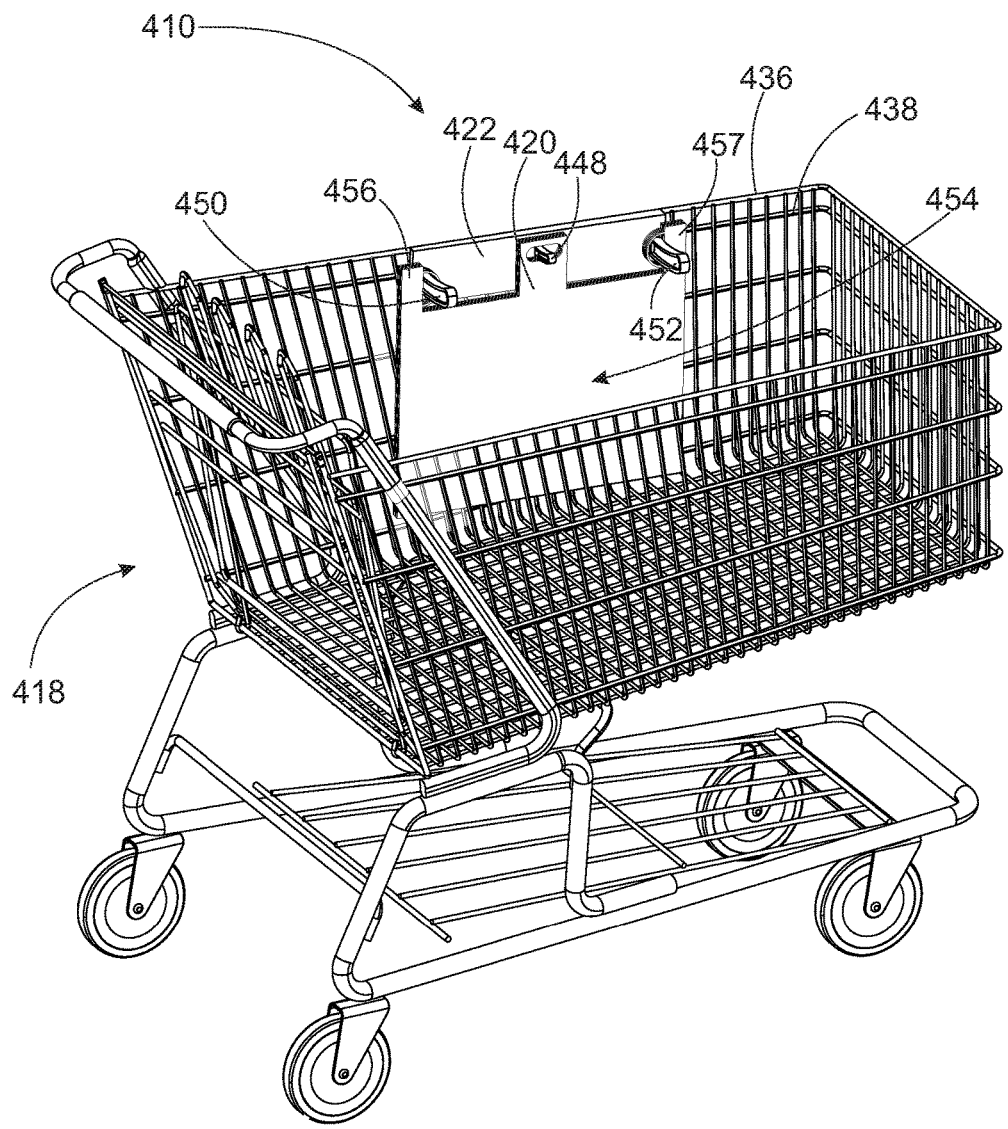
FIG. 1 shows a shopping cart bagging station coupled to a shopping cart.

Disclosed herein are embodiments of an invention related to retail store fixtures, and, more specifically, to a bagging station that couples to a shopping cart. The disclosed shopping cart bagging station can be used by customers to bag their purchases as they shop. The shopping cart bagging station can be made from recyclable materials and is lightweight and portable. The disclosed shopping cart bagging station includes a support bar and a first and a second mounting structure. The shopping cart bagging station holds a plurality of shopping bags, and dispenses the shopping bags one at a time as products are placed in a shopping bag. The first and the second mounting structure are each configured to couple the shopping cart bagging station to a shopping cart. The shopping cart bagging station can include a bag holder hook extending from the support bar, where the bag holder hook holds the plurality of shopping bags. A first and a second shopping bag handle arm extend from the support bar, where each of the first and the second shopping bag handle arms hold a handle of a shopping bag so the shopping bag is held open and items can be placed in the shopping bag. In some embodiments, the shopping cart bagging station is molded or otherwise formed of a single unitary piece of material. The shopping cart bagging station can be mounted in various locations on a shopping cart, making it easy and convenient for a customer to carry and load a plurality of shopping bags as they shop. The shopping cart bagging station can be provided by the retail store for customer use, much like the use of the shopping cart. Or, in some embodiments, the shopping cart bagging station is brought into the store by the customer. The disclosed shopping cart bagging station provides a means for a customer to load purchases into bags as they shop, instead of having to bag their purchases at a checkout station.

Disclosed herein is a shopping cart bagging station that includes a means to hold a plurality of shopping bags, and a means to removeably couple the means to hold the plurality of shopping bags to a shopping cart. The shopping cart bagging station also includes a means to hold one of the plurality of shopping bags open for insertion of items into the shopping bag. In some embodiments, the means to hold the plurality of shopping bags and the means to removeably couple the means to hold the plurality of shopping bags to a shopping cart are formed of a unitary piece of material. In some embodiments, the means to hold a plurality of shopping bags and the means to hold one of the plurality of shopping bags open for insertion of items are formed of a unitary piece of material. The material can be plastic, wood, or other lightweight material, and recyclable so the shopping cart bagging station is lightweight, easily carried, and can be recycled at its end of life. The shopping cart bagging station can be molded, machined, or cast from the piece of material. The means to hold the plurality of shopping bags, the means to hold one of the shopping bags open, and the means to removeably couple the means to hold the plurality of shopping bags to a shopping cart can take many different forms. The examples shown and described in this document are not meant to be limiting, and many other variations are possible in light of the teachings in this document.

Figure 2:
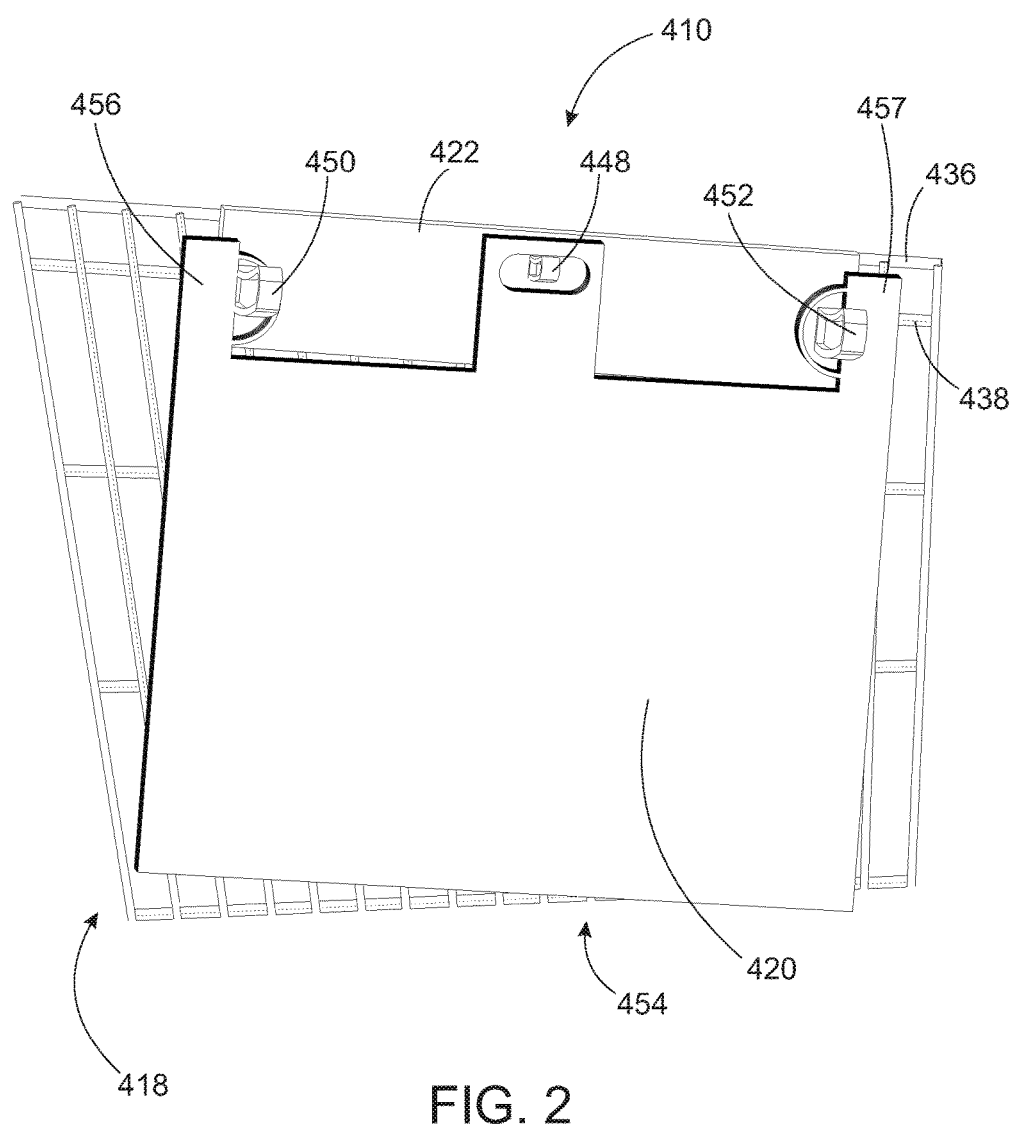
FIG. 2 shows a close-up view of the shopping cart bagging station of FIG. 1 coupled to a shopping cart.
Figure 3:
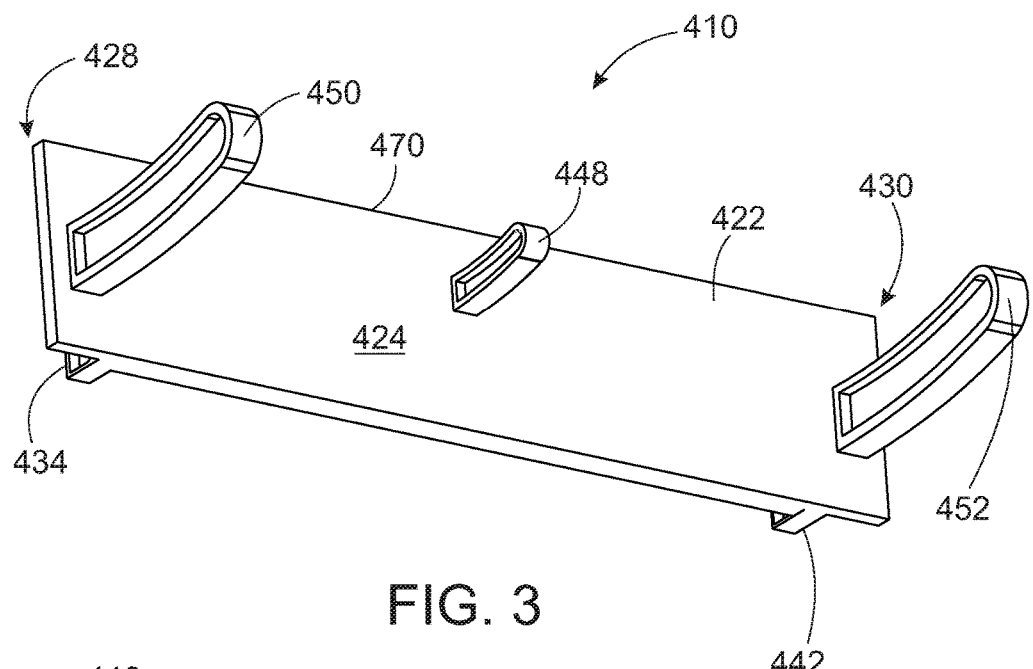
FIG. 3 shows a perspective view of the shopping cart bagging station of FIG. 1.
Figure 4:
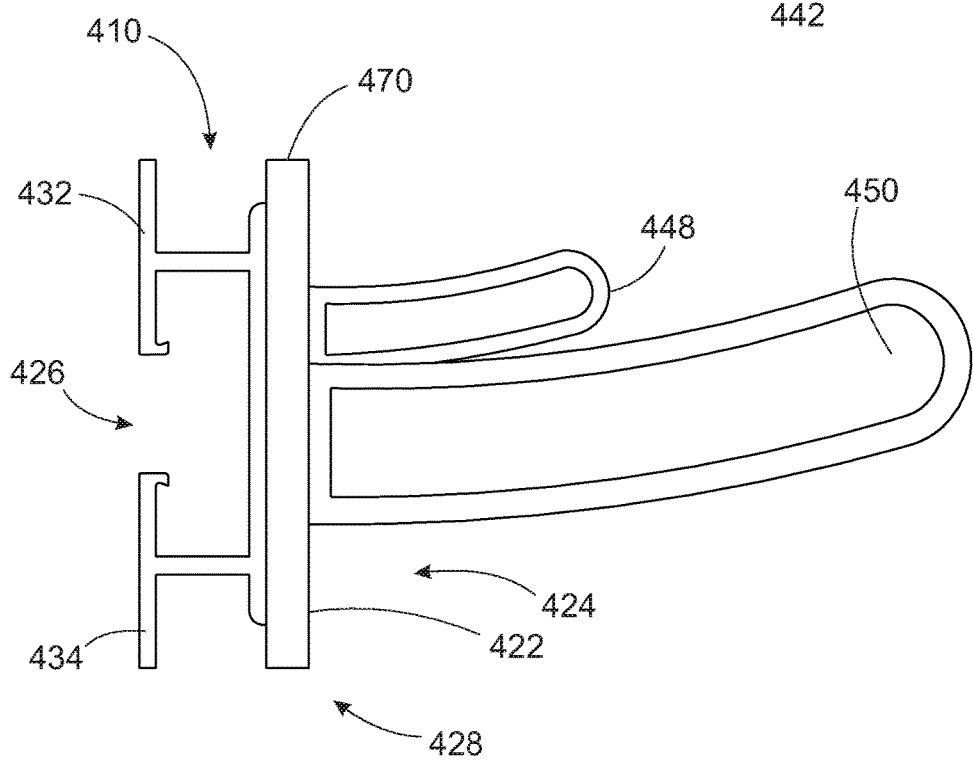
FIG. 4 shows a side perspective view of the shopping cart bagging station of FIG. 1.

FIG. 1 through FIG. 4 show an embodiment of a shopping cart bagging station 410. FIG. 1 shows a side perspective view of shopping cart bagging station 410 coupled to a shopping cart 418, with a plurality of shopping bags 454 being held by shopping cart bagging station 410. FIG. 2 shows a close-up perspective view of shopping cart bagging station 410 coupled to shopping cart 418. FIG. 3 shows a front perspective view of shopping cart bagging station 410, and FIG. 4 shows a side perspective view of shopping cart bagging station 410.

Shopping cart bagging station 410 is coupled to shopping cart 418 as shown in FIG. 1 and FIG. 2. Shopping cart bagging station 410 holds and dispenses plurality of shopping bag 454 as a shopper shops. An individual shopping bag 420 can be opened and filled as it hangs from shopping cart bagging station 410. Once shopping bag 420 is full, it can be removed from shopping cart bagging station 410 and placed in shopping cart 418. Having shopping cart bagging station 410 coupled to shopping cart 418 saves the customer from having to go to a checkout station to have their purchases bagged.

Referring to FIG. 3 and FIG. 4, shopping cart bagging station 410 includes a support bar 422 with a front surface 424, a rear surface 426, a first end 428 and a second end 430 opposing first end 428. Shopping cart bagging station 410 also includes a bag holder hook 448, a first shopping bag handle arm 450, and a second shopping bag handle arm 452. In this embodiment bag holder hook 458 is the means to hold a plurality of shopping bags, but this is not meant to be limiting. Plurality of shopping bags 454 is hung from bag holder hook 448 as shown in FIG. 1 and FIG. 2.

First shopping bag handle arm 450, and second shopping bag handle arm 452 are the means to hold one of plurality of shopping bags 454 open for insertion of items, but this is not meant to be limiting. To open an individual shopping bag 420, the shopping bag is pulled open, removing part of the shopping bag from bag holder hook 448. Shopping bag 420 hangs from first and second shopping bag handle arms 450 and 452 as it is being filled. First shopping bag handle 456 hangs from first shopping bag handle arm 450, and second shopping bag handle 457 hangs from second shopping bag handle holder arm 452, as shown in FIG. 1 and FIG. 2. First and second shopping bag handle arms 450 and 452 hold shopping bag 420 open as items are being put into shopping bag 420. It is to be understood that the means to hold a plurality of shopping bags and the means to hold one of the plurality of shopping bags open can take many different forms.

Shopping cart bagging station 410 also includes a first mounting structure 432, a second mounting structure not shown, a third mounting structure 434, and a fourth mounting structure 442 extending from support bar 422, as shown in FIG. 3 and FIG. 4. The second mounting structure is not shown in the figures, but is above fourth mounting structure 442, similar to first mounting structure 432 shown in FIG. 4. First, third, and fourth mounting structure 432, 434, and 442, and the second mounting structure, are the means to removeably couple the means to hold the plurality of shopping bags to a shopping cart in this embodiment, but this is not meant to be limiting. The means to removeably couple the means to hold the plurality of shopping bags to a shopping cart can take many different forms besides the examples shown and described in this document. In some embodiments, only one mounting structure 432, 434, 442, or the second mounting structure is used to removeably couple the means to hold the plurality of shopping bags to a shopping cart. In some embodiments, one or more of mounting structures 432, 440, 434, or the fourth mounting structure are used to removeably couple the means to hold the plurality of shopping bags to a shopping cart. In some embodiments, one or more of mounting structures 432, 434, or 442 take forms other than those shown in the figures. Mounting structures 432, 434, 442, or the second mounting structure can take any form that couples the means to hold the plurality of shopping bags to a shopping cart.

Referring back to FIG. 1 and FIG. 2, shopping cart bagging station 410 holds and dispenses plurality of shopping bags 454 as shown in FIG. 1 and FIG. 2. Bag holder hook 448 holds plurality of shopping bags 454, with first and second shopping bag handle arms 450 and 452 holding handles 456 and 457 of plurality of shopping bags 454. When a user wishes to fill a first one of plurality of shopping bags 454, for example, a bag 420 as shown in FIG. 1 and FIG. 2, bag 420 is pulled open and ready to receive items. First and second shopping bag handle arms 450 and 452 support bag 420 and the items placed in bag 420. Once the user is done filling bag 420, bag 420 is removed from shopping cart bagging station 410 and the process is repeated with a next one of plurality of shopping bags 454.

FIG. 3 and FIG. 4 illustrate support bar 422, bag holder hook 448, and first and second bag holder handle arms 450 and 452. Bag holder hook 448 in this embodiment extends from front surface 424 approximately halfway between first end 428 and second end 430 of support bar 422. Bag holder hook 448 in this embodiment is an elongate curved rod or arm, curved towards a top edge 470 of support bar 422 so that plurality of shopping bags 454 can be hung on bag holder hook 448. Bag holder hook 448 can take many different forms. Any form that allows bag holder hook 448 to hold a plurality of shopping bags can be used.

First and second shopping bag handle arms 450 and 452 each extend from front surface 424 of support bar 422. First shopping bag handle arm 450 extends from front surface 424 at first end 428. Second shopping bag handle arm 452 extends from front surface 424 at second end 430. Each of first and second shopping bag handle arms 450 and 452 are curved rods or bars in this embodiment, curved upwards towards a top edge 470 of support bar 422, so that each one of first and second shopping bar handle arms 450 and 452 can hold a handle 456 or 457 of one or more than one of plurality of shopping bags 454. First and second shopping bag handle arms 450 and 452 can take many different forms. First and second shopping bag handle arms 450 and 452 can take any form that allows first or second shopping bag handle arm 450 or 452 to hold a handle 456 or 457 of one or more than one of plurality of shopping bags 454. In some embodiments, only one of first or second shopping bag handle arms 450 and 452 is used. In some embodiments, more than two shopping bag handle arms are used for shopping cart bagging station 410.

In some embodiments, support bar 422 and bag holder hook 448 are formed of one unitary piece of material. In some embodiments, support bar 422, bag holder hook 448, and first and second shopping bag handle arms 450 and 452 are formed of a single piece of material. The single piece of material can be plastic, wood or any other rigid material. Forming shopping cart bagging station 410 from plastic, wood, or other lightweight rigid material makes shopping cart bagging station 410 lightweight and easily carried, so a customer can carry a shopping cart bagging station 410 with them as they shop different stores, for example. In some embodiments, support bar 422, bag holder hook 448, and first and second shopping bag handler arms 450 and 452 are formed of a single piece of recyclable material so that shopping cart bagging station 410 can be recycled at its end of life. In some embodiments, support bar 422, bag holder hook 448, and first and second shopping bag handle arms 450 and 452 are molded, machined or cast from a single piece of material.

Shopping cart bagging station 410 also includes first mounting structure 432 (FIG. 4), a second mounting structure that is not shown, a third mounting structure 434 (FIG. 4), and a fourth mounting structure 442 (FIG. 3). In this embodiment, first mounting structure 432 and the second mounting structure extend from rear surface 426. First mounting structure 432 extends from rear surface 426 at first end 428. The second mounting structure is not shown in the figures, but is above fourth mounting structure 442 at second end 430, and is shaped similar to first mounting structure 432 shown in FIG. 4. In some embodiments, only first mounting structures 432 and the second mounting structure are used on shopping cart bagging station 410. First mounting structure 432 and the second mounting structure removeably couple shopping cart bagging station 410 to a shopping cart, such as shopping cart 418. In the embodiment shown, first mounting structure 432 and the second mounting structure couple to a first rod 436 of shopping cart 418, as shown in FIG. 1 and FIG. 2. In this embodiment, first mounting structure 432 and the second mounting structure include clips that clip to, and removeably hold, shopping cart bagging station 410 to first rod 436. In some embodiments, first mounting structures 432 and the second mounting structure take other forms. In some embodiments, the shopping cart takes other forms, and first mounting structures 432 and the second mounting structure take a form that couples to the shopping cart. In some embodiments, first mounting structure 432, the second mounting structure, and support bar 422 are formed of a single piece of material, which can be recyclable and lightweight such as recyclable plastic.

Third mounting structure 434 and fourth mounting structure 442 also extend from rear surface 426 of support bar 422. Third mounting structure 434 extends from rear surface 426 at first end 428 below first mounting structure 432, as shown in FIG. 4. Fourth mounting structure 442 extends from rear surface 426 at second end 430, below the second mounting structure. Third mounting structure 434 and fourth mounting structure 442 removeably couple shopping cart bagging station 410 to shopping cart 418. In the embodiment shown, third mounting structure 434 and fourth mounting structure 442 couple to a second rod 438 (FIG. 1 and FIG. 2) of shopping cart 418. In this embodiment, third mounting structure 434 and fourth mounting structure 442 include clips that clip to, and removeably hold, shopping cart bagging station 410 to second rod 438. In some embodiments, third mounting structures 434 and fourth mounting structure 442 take other forms. In some embodiments, the shopping cart takes other forms, and third mounting structures 434 and fourth mounting structure 442 take a form that couples to the shopping cart. In some embodiments, third mounting structures 434 and fourth mounting structure 442 and support bar 422 are formed of a single piece of material, which can be recyclable and lightweight such as recyclable plastic.

In this embodiment, first, third and fourth mounting structures 432, 434, 442 and the second mounting structure are the means to removeably couple the means to hold the plurality of shopping bags to a shopping cart, but this is not meant to be limiting.

It is to be understood that first, third and fourth mounting structures 432, 434, 442 and the second mounting structure can take many different forms, when they are used. First, third and fourth mounting structures 432, 434, 442 and the second mounting structure can be designed and made to couple to any rod or part of a shopping cart.

With first, third and fourth mounting structures 432, 434, 442 and the second mounting structure coupling shopping cart bagging station 410 to a shopping cart as shown in FIG. 1 and FIG. 2, shopping cart bagging station 410 can be used by a customer to dispense bags as needed while the customer shops. Shopping cart bagging station 410 can be coupled to any location of a shopping cart. FIG. 1 and FIG. 2 show shopping cart bagging station 410 coupled to an interior side of shopping cart 418, but this is not meant to be limiting. Shopping cart bagging station 410 can be coupled to the interior or exterior of a shopping cart. Shopping cart bagging station 410 can be coupled to the front, sides, rear, edges, or bottom of a shopping cart. In some embodiments, the shopping cart will take a form other than shopping cart 418, and the means to couple bagging station 410 to the shopping cart will take another form consistent with the form of the shopping cart.

Figure 5:
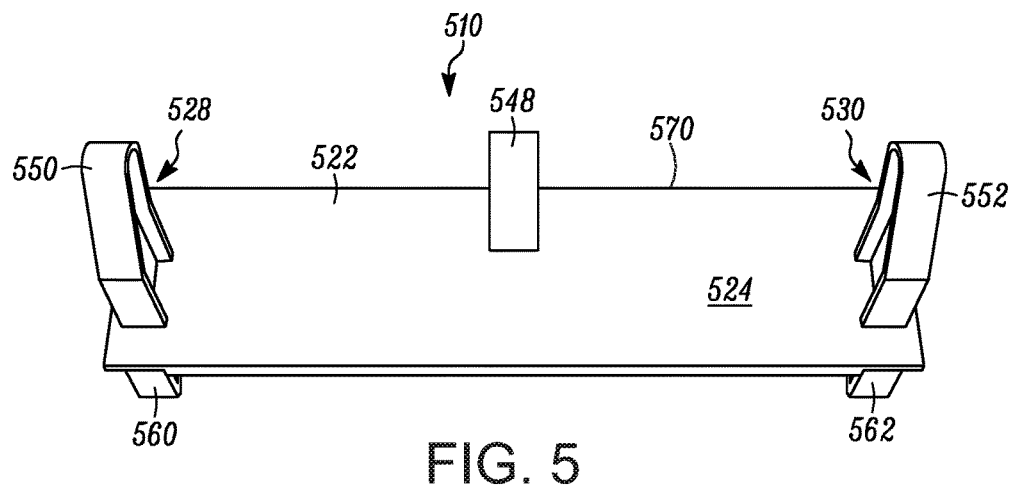
FIG. 5 shows a front perspective view of a further embodiment of a shopping cart bagging station.
Figure 6:
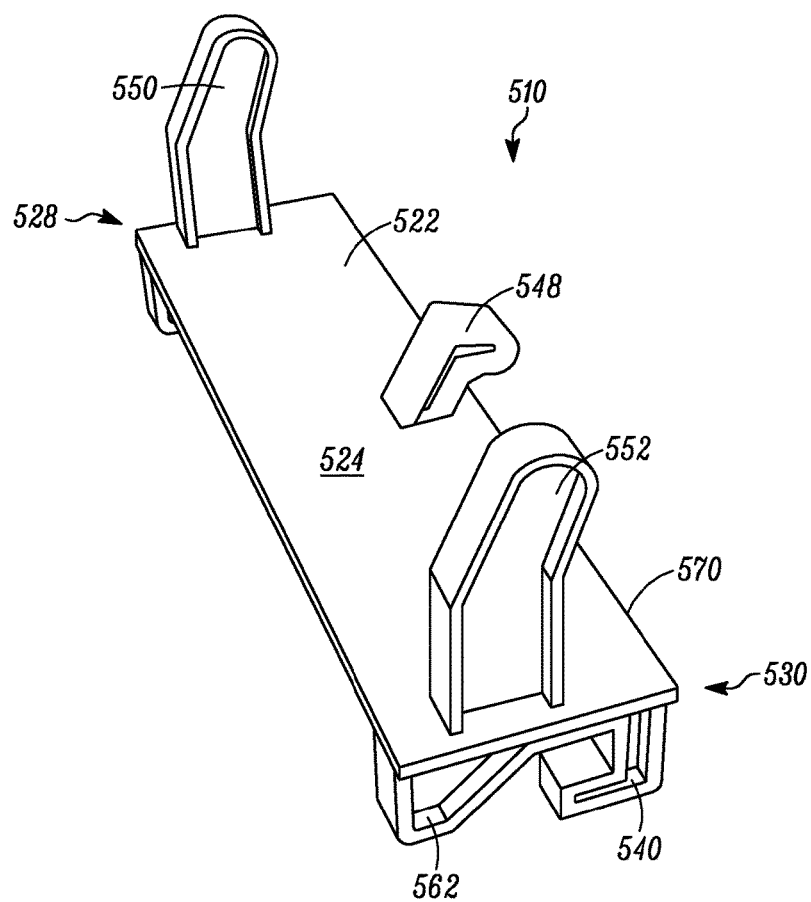
FIG. 6 shows a further front perspective view of the shopping cart bagging station of FIG. 5.
Figure 7:
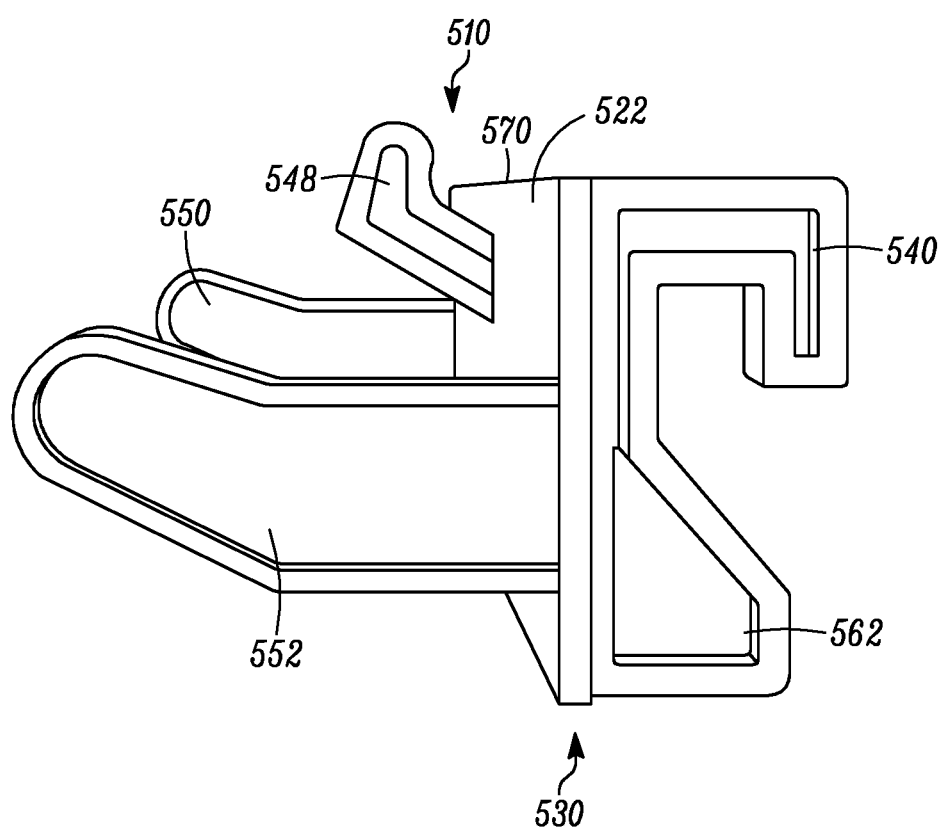
FIG. 7 shows a side perspective view of the shopping cart bagging station of FIG. 5.
Figure 8:
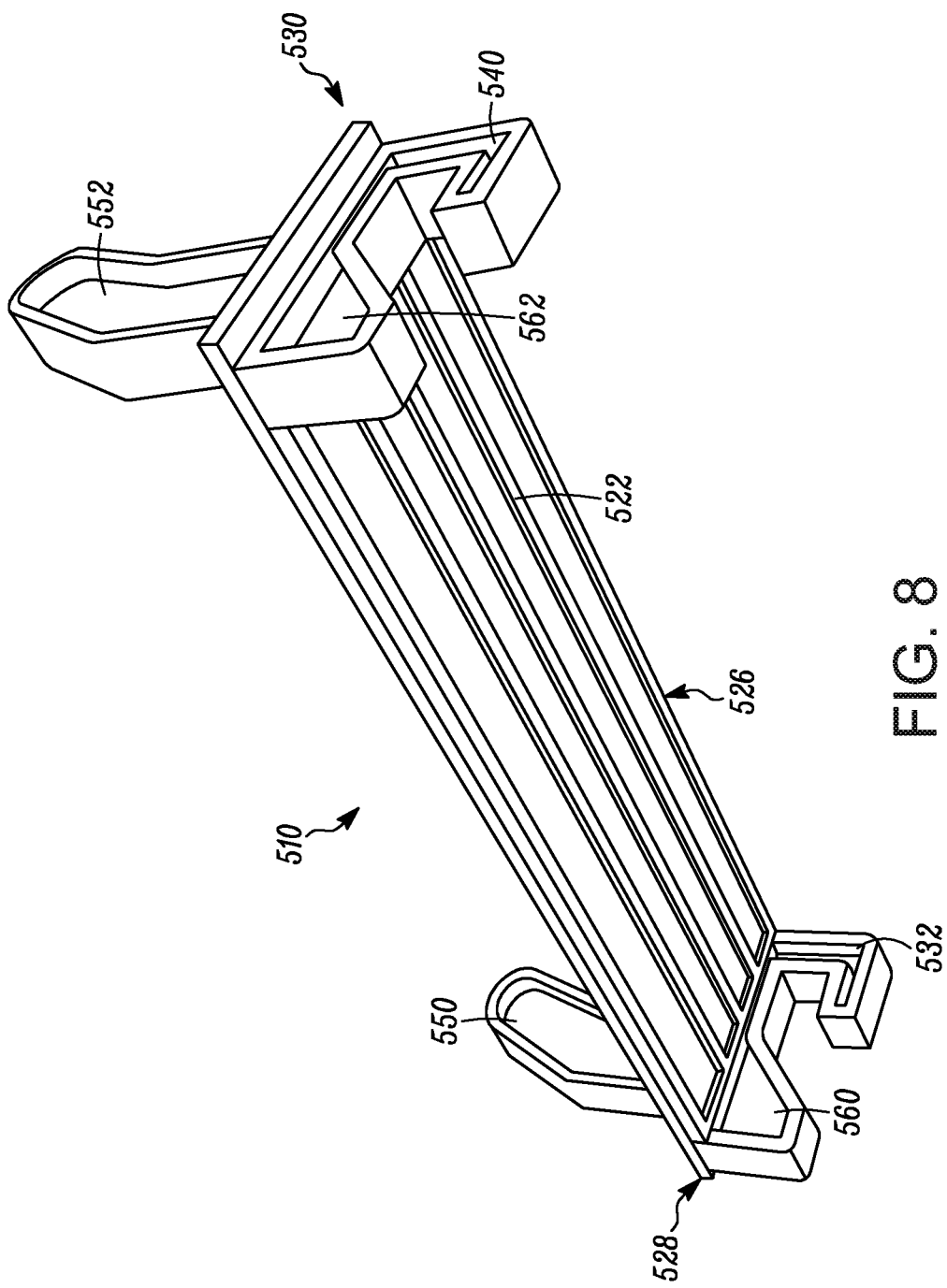
FIG. 8 show a rear perspective view of the shopping cart bagging station of FIG. 5.

FIG. 5 through FIG. 8 show an embodiment of a shopping cart bagging station 510. FIG. 5 shows a front perspective view of shopping cart bagging station 510. FIG. 6 shows another front perspective view of shopping cart bagging station 510. FIG. 7 shows a side perspective view of shopping cart bagging station 510. FIG. 8 shows a bottom perspective view of shopping cart bagging station 510.

Shopping cart bagging station 510 couples to a shopping cart, and holds and dispenses a plurality of shopping bags, as described for shopping cart bagging station 410 above. Shopping cart bagging station 510 includes similar elements to shopping cart bagging station 410, with similar numbers indicating similar elements to shopping cart bagging station 410.

Shopping cart bagging station 510 includes a support bar 522 with a front surface 524, a rear surface 526, a first end 528 and a second end 530 opposing first end 528, as can be seen in FIG. 5 through FIG. 8. Shopping cart bagging station 510 also includes a bag holder hook 548, a first shopping bag handle arm 550, and a second shopping bag handle arm 552. In this embodiment, bag holder hook 558 is the means to hold a plurality of shopping bags, but this is not meant to be limiting. First shopping bag handle arm 550 and second shopping bag handle arm 552 are the means to hold one of the plurality of shopping bags open for insertion of items, but this is not meant to be limiting. The means to hold a plurality of shopping bags and the means to hold one of the plurality of shopping bags open can take many different forms.

Shopping cart bagging station 510 also includes a first mounting structure 532, a second mounting structure 540, a first post 560, and a second post 562 extending from support bar 422, as can best be seen in FIG. 8. First and second mounting structure 532 and 540 are the means to removeably couple the means to hold the plurality of shopping bags to a shopping cart in this embodiment, but this is not meant to be limiting. The means to removeably couple the means to hold the plurality of shopping bags to a shopping cart can take many different forms besides the examples shown and described in this document. In some embodiments, one or more of first or second mounting structures 532 and 540 take forms other than those shown in the figures. Mounting structures 532 and 540 can take any form that couples the means to hold the plurality of shopping bags to a shopping cart.

Shopping cart bagging station 510 holds and dispenses a plurality of shopping bags, similar to shopping cart bagging station 410 as described above and shown in FIG. 1 and FIG. 2. Bag holder hook 548 holds the plurality of shopping bags, with first and second shopping bag handle arms 550 and 552 holding the handles of the plurality of shopping bags. When a user wishes to fill a first one of the plurality of shopping bags, a first bag is pulled open and ready to receive items. First and second shopping bag handle arms 550 and 552 support the bag and the items placed in the bag. Once the user is done filling the shopping bag, the shopping bag is removed from shopping cart bagging station 510 and the process is repeated with a next one of the plurality of shopping bags.

FIG. 5 through FIG. 8 illustrate support bar 522, bag holder hook 548, and first and second shopping bag handle arms 550 and 552. Bag holder hook 548 in this embodiment extends from front surface 524 approximately halfway between first end 528 and second end 530 of support bar 522. Bag holder hook 548 in this embodiment is an elongate curved rod or arm, curved (hooked) towards a top edge 570 of support bar 522 so that a plurality of shopping bags can be hung on bag holder hook 548. Bag holder hook 548 can take many different forms. Any form that allows bag holder hook 548 to hold a plurality of shopping bags can be used.

First and second shopping bag handle arms 550 and 552 each extend from front surface 524 of support bar 522. First shopping bag handle arm 550 extends from front surface 524 at first end 528. Second shopping bag handle arm 552 extends from front surface 524 at second end 530. Each of first and second shopping bag handle arms 550 and 552 are curved rods or bars in this embodiment, curved upwards (hooked) towards top edge 570 of support bar 522, so that each one of first and second shopping bag handle arms 550 and 552 can hold a handle of one or more than one of the plurality of shopping bags. First and second shopping bag handle arms 550 and 552 can take many different forms. First and second shopping bag handle arms 550 and 552 can take any form that allows first or second shopping bag handle arm 550 or 552 to hold a handle of one or more of the plurality of shopping bags. In some embodiments, only one of first or second shopping bag handle arms 550 and 552 is used. In some embodiments, more than two shopping bag handle arms are used for shopping cart bagging station 510.

In some embodiments, support bar 522 and bag holder hook 548 are formed of one unitary piece of material. In some embodiments, support bar 522, bag holder hook 548, and first and second shopping bag handle arms 550 and 552 are formed of a single piece of material. The single piece of material can be plastic, wood or any other rigid piece of material. Forming shopping cart bagging station 510 from plastic, wood, or other lightweight rigid material makes shopping cart bagging station 510 lightweight and easily carried so a customer can carry a shopping cart bagging station 510 with them, for example. In some embodiments, support bar 522, bag holder hook 548, and first and second shopping bag handle arms 550 and 552 are formed of recyclable material so that shopping cart bagging station 510 can be recycled at its end of life. In some embodiments, support bar 522, bag holder hook 548, and first and second shopping bag handle arms 550 and 552 are molded, machined or cast from a single piece of material.

Shopping cart bagging station 510 also includes first mounting structure 532, second mounting structure 540, first post 560, and second post 562 (as can best be seen in FIG. 8). In this embodiment, first mounting structure 532 and second mounting structure 540 extend from rear surface 526. First mounting structure 532 extends from rear surface 526 at first end 528. Second mounting structure 540 extends from rear surface 526 at second end 530. First and second mounting structure 532 and 540 removeably couple shopping cart bagging station 510 to a shopping cart. In the embodiment shown, first and second mounting structure 532 and couple to a first rod of a shopping cart, which can be first rod 436 of shopping cart 418, as shown with shopping cart bagging station 410 in FIG. 1 and FIG. 2. In the embodiment shown in FIG. 5 through FIG. 8, first and second mounting structures 532 and 540 are hook-shaped elements that removeably hook onto (couple to), and removeably hold shopping cart bagging station 510 to a rod of a shopping cart. In some embodiments, first and second mounting structures 532 and 540 take other forms. In some embodiments, the shopping cart takes other forms other than the example shopping cart 418 shown in FIG. 1 and FIG. 2, and first and second mounting structures 532 and 540 take a form that couples to the shopping cart. In some embodiments, first and second mounting structure 532 and 540 and support bar 522 are formed of a single piece of material, which can be recyclable and lightweight such as recyclable plastic.

First post 560 and second post 562 also extend from rear surface 526 of support bar 522. First post 560 extends from rear surface 526 at first end 528, as shown in FIG. 8. Second post 562 extends from rear surface 526 at second end 530, as shown in FIG. 8. In this embodiment, first and second post 560 and 562 are post extensions from rear surface 526. First post 560 and second post 562 help first and second mounting structure 532 and 540 couple to the shopping cart by being shaped to guide a rod of the shopping cart into the hook-shaped first and second mounting structures 532 and 540. In this embodiment first post 560 and second post 562 help first and second mounting structure 532 and 540 hold the rod of the shopping cart securely. In some embodiments, first post 560 and second post 562 take other forms. In some embodiments, the shopping cart takes other forms, and first and second post 560 and 562 take a form that couples to the shopping cart. In some embodiments, first and second post 560 and 562 and support bar 522 are formed of a single piece of material, which can be recyclable and lightweight such as recyclable plastic.

In this embodiment, first and second mounting structures 532 and 540 are the means to removeably couple the means to hold the plurality of shopping bags to a shopping cart, but this is not meant to be limiting. It is to be understood that first and second mounting structures 532 and 540 and first and second post 560 and 562 can take many different forms, when they are used. First and second mounting structures 532 and 540 can be designed and made to couple to any rod or part of a shopping cart.

With first and second mounting structures 532 and 540 coupling shopping cart bagging station 510 to a shopping cart, shopping cart bagging station 510 can be used by a customer to dispense bags as needed while the customer shops. Shopping cart bagging station 510 can be coupled to a shopping cart in many different positions in the shopping cart. Shopping cart bagging station 510 can be coupled to the interior or exterior of a shopping cart. Shopping cart bagging station 510 can be coupled to the front, sides, rear, edges, or bottom of a shopping cart. Shopping cart bagging station 510 can be molded, machined, or cast from lightweight recyclable material so shopping cart bagging station is easy to transport and recyclable.

Disclosed is a method of forming a shopping cart bagging station that includes forming the shopping cart bagging station from a unitary piece of material. The piece of material can be plastic, wood, or other natural or man-made substances. The piece of material can be made from recyclable substances. Forming can include molding, machining, or casting the shopping cart bagging station from the piece of material.

In some embodiments, the act of forming can include forming a support bar, a first mounting structure, and a second mounting structure from a unitary piece of material, where the first and the second mounting structure couple the support bar to a shopping cart. In some embodiments, the act of forming can include forming a support bar, a first mounting structure, a second mounting structure and a bag holder hook from a unitary piece of material, where the first and the second mounting structure couple the support bar to a shopping cart, and where the bag holder hook holds a plurality of shopping bags. In some embodiments, the act of forming includes forming a support bar, a first mounting structure, a second mounting structure, a first shopping bag handle arm, a second shopping bag handle arm, and a bag holder hook from a unitary piece of material, where the first and the second mounting structure couple the support bar to a shopping cart, and where the bag holder hook holds a plurality of shopping bags.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
a support bar with a front surface, a rear surface, a first end and a second end; and a first and a second mounting structure extending from the support bar, wherein the first and the second mounting structure are hook shaped elements that hook onto, and removeably couple the shopping cart bagging station to a first rod of a shopping cart;
a first and a second post, wherein the first post extends from the rear surface at the first end, and the second post extends from the rear surface at the second end, wherein the first and second mounting structure and the first and second post are formed from one unitary piece of material, and wherein the first and the second post removeably couple to the first rod of the shopping cart;
a bag holder hook, wherein the bag holder hook holds a plurality of shopping bags;
a first shopping bag handle arm, wherein the first shopping bag handle arm holds a first handle of one of the plurality of shopping bags;
a second shopping bag handle arm, wherein the second shopping bag handle arm holds a second handle of one of the plurality of shopping bags; wherein:
the first mounting structure extends from the rear surface at the first end;
the second mounting structure extends from the rear surface at the second end;
the bag holder hook extends from the front surface approximately halfway between the first end and the second end; the first shopping bag handle arm extends from the front surface at the second end;
and wherein the support bar, the first and the second mounting structure, the bag holder hook, and the first and second shopping bag handle arm are formed of one unitary piece of material.

2. The shopping cart bagging station of claim 1, wherein:
the first mounting structure extends from the rear surface at the first end; and
the second mounting structure extends from the rear surface at the second end.

3. The shopping cart bagging station of claim 2, further comprising:
a third mounting structure extending from the rear surface at the first end; and
a fourth mounting structure extending from the rear surface at the second end;
wherein the third and the fourth mounting structure couple to the shopping cart.

4. The shopping cart bagging station of claim 3, wherein the third and the fourth mounting structure couple to a second rod of the shopping cart.

5. The shopping cart bagging station of claim 4, wherein the support bar and the first and the second mounting structure are formed of one unitary piece of material.

* * * * *